(12) United States Patent
Lee et al.

(10) Patent No.: US 12,456,211 B2
(45) Date of Patent: Oct. 28, 2025

(54) ELECTRONIC DEVICE AND METHOD FOR CONTROLLING SAME

(71) Applicant: SAMSUNG ELECTRONICS CO., LTD., Suwon-si (KR)

(72) Inventors: Taehee Lee, Suwon-si (KR); Sungwon Kim, Suwon-si (KR); Saeyoung Kim, Suwon-si (KR); Yoojeong Lee, Suwon-si (KR); Junghwan Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 275 days.

(21) Appl. No.: 18/102,527

(22) Filed: Jan. 27, 2023

(65) Prior Publication Data

US 2023/0177709 A1 Jun. 8, 2023

Related U.S. Application Data

(63) Continuation of application No. PCT/KR2021/008433, filed on Jul. 2, 2021.

(30) Foreign Application Priority Data

Jul. 29, 2020 (KR) .................. 10-2020-0094153

(51) Int. Cl.
*G06T 7/55* (2017.01)
*G01S 17/87* (2020.01)
(Continued)

(52) U.S. Cl.
CPC ............... *G06T 7/55* (2017.01); *G01S 17/87* (2013.01); *G01S 17/894* (2020.01); *G06T 7/521* (2017.01);
(Continued)

(58) Field of Classification Search
CPC ........... G06T 7/55; G06T 7/521; G06T 7/593; G06T 7/596; G06T 7/11; G06T 7/90;
(Continued)

(56) References Cited

U.S. PATENT DOCUMENTS 8,718,326 B2 5/2014 Yoon et al.
9,648,302 B2 5/2017 Xie et al.
(Continued)

FOREIGN PATENT DOCUMENTS

CN 205123933 U 3/2016
CN 105554369 A 5/2016
(Continued)

OTHER PUBLICATIONS

Written Opinion (PCT/ISA/237) issued Oct. 18, 2021 by the International Searching Authority for International Patent Application No. PCT/KR2021/008433.
(Continued)

*Primary Examiner* — John B Strege
(74) *Attorney, Agent, or Firm* — Sughrue Mion, PLLC

(57) ABSTRACT

An electronic device is disclosed. The electronic device may comprise a first image sensor, a second image sensor, and a processor, wherein the processor may: acquire a first depth image and a confidence map by using the first image sensor; acquire an RGB image by using the second image sensor; acquire a second depth image on the basis of the confidence map and the RGB image; and acquire a third depth image by composing the first depth image and the second depth image on the basis of the pixel value of the confidence map.

17 Claims, 9 Drawing Sheets

(51) Int. Cl.
  *G01S 17/894* (2020.01)
  *G06T 7/521* (2017.01)
  *G06V 10/22* (2022.01)

(52) U.S. Cl.
  CPC .... *G06V 10/22* (2022.01); *G06T 2207/10012* (2013.01); *G06T 2207/10024* (2013.01); *G06T 2207/10028* (2013.01); *G06T 2207/20212* (2013.01)

(58) Field of Classification Search
  CPC . G06T 2207/10012; G06T 2207/10024; G06T 2207/10028; G06T 2207/20212; G06T 2207/20221; G06T 5/50; G06T 3/40; G01S 17/87; G01S 17/894; G06V 10/22
  See application file for complete search history.

(56) References Cited

U.S. PATENT DOCUMENTS

| | | | |
|---|---|---|---|
| 9,990,727 | B2 | 6/2018 | Yoon et al. |
| 10,096,170 | B2 | 10/2018 | Lee |
| 10,866,321 | B2 | 12/2020 | Yamada |
| 11,004,223 | B2 | 5/2021 | Jakubiak et al. |
| 11,321,575 | B2 | 5/2022 | Bao et al. |
| 2012/0056982 | A1 | 3/2012 | Katz et al. |
| 2012/0134537 | A1 | 5/2012 | Yoon et al. |
| 2012/0195471 | A1* | 8/2012 | Newcombe ............. G06T 7/194 382/106 |
| 2017/0148137 | A1* | 5/2017 | Tanaka .................. G06T 3/4007 |
| 2018/0275278 | A1 | 9/2018 | Yamada |
| 2019/0174118 | A1* | 6/2019 | Wei ...................... H04N 13/239 |
| 2019/0349702 | A1* | 11/2019 | Miller ..................... H04S 7/303 |
| 2020/0134784 | A1* | 4/2020 | Chen ......................... G06T 5/70 |
| 2020/0162719 | A1 | 5/2020 | Tadi et al. |
| 2020/0279120 | A1 | 9/2020 | Bao et al. |
| 2020/0412937 | A1* | 12/2020 | Huang ................. H04N 23/611 |
| 2020/0412940 | A1* | 12/2020 | Huang ................... G06V 10/82 |
| 2021/0082135 | A1* | 3/2021 | Xu ......................... G06T 7/529 |
| 2021/0181349 | A1 | 6/2021 | Lee et al. |
| 2022/0111839 | A1* | 4/2022 | Jiang ...................... G06T 7/593 |
| 2022/0207825 | A1* | 6/2022 | Ren ....................... G06V 10/48 |
| 2024/0135578 | A1* | 4/2024 | Kim ....................... G06T 17/00 |

FOREIGN PATENT DOCUMENTS

| | | |
|---|---|---|
| CN | 106954058 A | 7/2017 |
| CN | 110352446 A | 10/2019 |
| JP | WO2018/042801 A1 | 3/2018 |
| KR | 10-1220527 B1 | 1/2013 |
| KR | 10-2013-0055088 A | 5/2013 |
| KR | 10-2014-0019765 A | 2/2014 |
| KR | 10-1706093 B1 | 2/2017 |
| KR | 10-1714224 B1 | 3/2017 |
| KR | 10-2083293 B1 | 4/2020 |
| KR | 10-2104031 B1 | 4/2020 |
| KR | 10-2020-0081450 A | 7/2020 |
| KR | 10-2252915 B1 | 5/2021 |

OTHER PUBLICATIONS

Search Report (PCT/ISA/210) issued Oct. 18, 2021 by the International Searching Authority for International Patent Application No. PCT/KR2021/008433.

K. Walas, M. Nowicki, D. Ferstl and P. Skrzypczyński, "Depth data fusion for simultaneous localization and mapping—RGB-DD SLAM", 2016 IEEE International Conference on Multisensor Fusion and Integration for Intelligent Systems (MFI), Baden-Baden, Germany, 2016, pp. 9-14, doi: 10.1109/MFI.2016.7849459.

Pongsak Lasang, Wuttipong Kumwilaisak, Yazhou Liu, Sheng Mei Shen, "Optimal depth recovery using image guided TGV with depth confidence for high-quality view synthesis", Journal of Visual Communication and Image Representation, vol. 39, 2016, pp. 24-39, ISSN 1047-3203, doi: 10.1016/j.jvcir.2016.05.006.

European Extended Search Report issued Dec. 4, 2023 issued by the European Patent Office for EP Patent Application No. 21850284.7.

Notice of Allowance dated Jul. 21, 2025, issued by the Chinese Patent Office in Chinese Patent Application No. 202180058359.2.

* cited by examiner

ELECTRONIC DEVICE AND METHOD FOR CONTROLLING SAME

CROSS-REFERENCE TO RELATED APPLICATION

This application is a bypass continuation of International Application No. PCT/KR2021/008433 designating the United States, filed on Jul. 2, 2021, in the Korean Intellectual Property Receiving Office and claims priority from Korean Patent Application No. KR 10-2020-0094153, filed on Jul. 29, 2020, the disclosures of which are incorporated by reference herein in their entireties.

BACKGROUND

1. Field

The disclosure relates to an electronic device and a method for controlling the same, and more particularly, to an electronic device for acquiring a depth image and a method for controlling the same.

2. Description of Related Art

In recent years, with the development of electronic technology, research on autonomous driving robots has been actively conducted. For smooth driving of the robot, it is important to obtain accurate depth information about the robot's surroundings. In order to acquire depth information, time of flight (ToF) sensors that acquire a depth image based on flight time or phase information of light, or a stereo cameras that acquire a depth image based on an image captured by two cameras may be used.

However, the ToF sensors and the stereo cameras may have the following drawbacks. For example, while the ToF sensors have superior angular resolution for a long distance compared to the stereo camera, the ToF sensors have a limitation in that the accuracy of near-field information is relatively low due to multiple reflections. On the other hand, although the stereo cameras may acquire short-distance information with relatively high accuracy, two cameras need to be far apart from each other for long-distance measurement, so the stereo cameras have the disadvantage of being difficult to manufacture small in size.

Accordingly, there is a need for a technique for acquiring a depth image with high accuracy of near-field information while being easy to miniaturize.

SUMMARY

The disclosure provides an electronic device that is easy to miniaturize and has improved accuracy of distance information for a short distance.

Objects of the disclosure are not limited to the above-mentioned objects. That is, other objects that are not mentioned may be obviously understood by those skilled in the art from the following description.

According to an aspect of the disclosure, there is provided an electronic device, including: a first image sensor; a second image sensor; and a processor configured to: obtain a first depth image and a confidence map corresponding to the first depth image based on information received from the first image sensor, obtain an RGB image corresponding to the first depth image based on information received from the second image sensor, obtain a second depth image based on the confidence map and the RGB image, and obtain a third depth image based on a composition of the first depth image and the second depth image determined based on a pixel value of the confidence map.

The processor may be further configured to obtain a grayscale image from the RGB image, and the second depth image is obtained by performing stereo matching on the confidence map and the grayscale image.

The processor may be further configured to obtain the second depth image by performing stereo matching on the confidence map and the grayscale image based on a shape of an object included in the confidence map and the grayscale image.

The processor may be further configured to: determine a first composition ratio value of the first depth image and a second composition ratio value of the second depth image based on the pixel value of the confidence map, and obtain the third depth image by combining the first depth image and the second depth image based on the first composition ratio value and the second composition ratio value.

The processor may be further configured to: determine the first composition ratio value of the first depth image to be greater than the second composition ratio value of the second depth image for a first region in which a pixel value is greater than a reference value among a plurality of regions of the confidence map, and determine the first composition ratio value to be smaller than the second composition ratio value for the region in which the pixel value is smaller than the reference value among a plurality of regions of the confidence map.

The processor may be further configured to: obtain a depth value of the second depth image as a depth value of the third depth image for a first region in the third depth image corresponding to a first region among a plurality of regions of the first depth image, in which a depth value of the first depth image is smaller than a first threshold distance, and obtain a depth value of the first depth image as a depth value of the third depth image for a second region in the third depth image corresponding to a second region among a plurality of regions of the first depth image in which a depth value of the first depth image is greater than a second threshold distance.

The processor may be further configured to: identify an object included in the RGB image, identify each region of the first depth image and the second depth image corresponding to the identified object, and obtain the third depth image by combining the first depth image and the second depth image based on a composition ratio for each of the regions.

The first image sensor may be a time of flight (ToF) sensor, and the second image sensor may be an RGB sensor.

According to an aspect of the disclosure, there is provided a method for controlling an electronic device, including: obtaining a first depth image and a confidence map corresponding to the first depth image based on information received from a first image sensor; obtaining an RGB image corresponding to the first depth image based on information received from a second image sensor; obtaining a second depth image based on the confidence map and the RGB image; and obtaining a third depth image based on a composition of the first depth image and the second depth image determined based on a pixel value of the confidence map.

The method further includes obtaining a grayscale image for the RGB image, and obtaining the second depth image by stereo matching the confidence map and the grayscale image.

The method further includes obtaining the second depth image by stereo matching the confidence map and the grayscale image based on a shape of an object included in the confidence map and the grayscale image.

The method further includes determining a first composition ratio value of the first depth image and a second composition ratio value of the second depth image based on the pixel value of the confidence map, and obtaining the third depth image by combining the first depth image and the second depth image based on the first composition ratio value and the second composition ratio value.

The method further includes determining the first composition ratio value of the first depth image to be greater than the second composition ratio value of the second depth image for a first region in which a pixel value is greater than a reference value among a plurality of regions of the confidence map, and determining the first composition ratio value to be smaller than the second composition ratio value for the region in which the pixel value is smaller than the reference value among a plurality of regions of the confidence map.

The method further includes obtaining a depth value of the second depth image as a depth value of the third depth image for a first region in the third depth image corresponding to a first region among a plurality of regions of the first depth image, in which a depth value of the first depth image is smaller than a first threshold distance, and obtaining a depth value of the first depth image as a depth value of the third depth image for a second region in the third depth image corresponding to a second region among a plurality of regions of the first depth image in which a depth value of the first depth image is greater than a second threshold distance.

The method further includes identifying an object included in the RGB image; identifying each region of the first depth image and the second depth image corresponding to the identified object, and acquiring the third depth image by combining the first depth image and the second depth image based on a composition ratio for each of the identified regions.

Technical solutions of the disclosure are not limited to the abovementioned solutions, and solutions that are not mentioned will be clearly understood by those skilled in the art to which the disclosure pertains from the present specification and the accompanying drawings.

According to various embodiments of the disclosure, the electronic device may acquire distance information with improved accuracy of distance information for a short distance compared to the related art ToF sensor.

According various embodiments of the disclosure, an autonomous vehicle or a robot may be driven smoothly based on the distance information acquired with improved accuracy. However, the disclosure is not limited to driving an autonomous vehicle or a robot with the distance information acquired with improved accuracy. As such, according to various other example embodiment, the distance information acquired with improved accuracy may be applied in other manner.

In addition, the effects obtainable or predicted by the example embodiments of the disclosure are to be disclosed directly or implicitly in the detailed description of the example embodiments of the disclosure. For example, various effects predicted according to embodiments of the disclosure will be disclosed in the detailed description to be described later.

DETAILED DESCRIPTION

Figure 1:
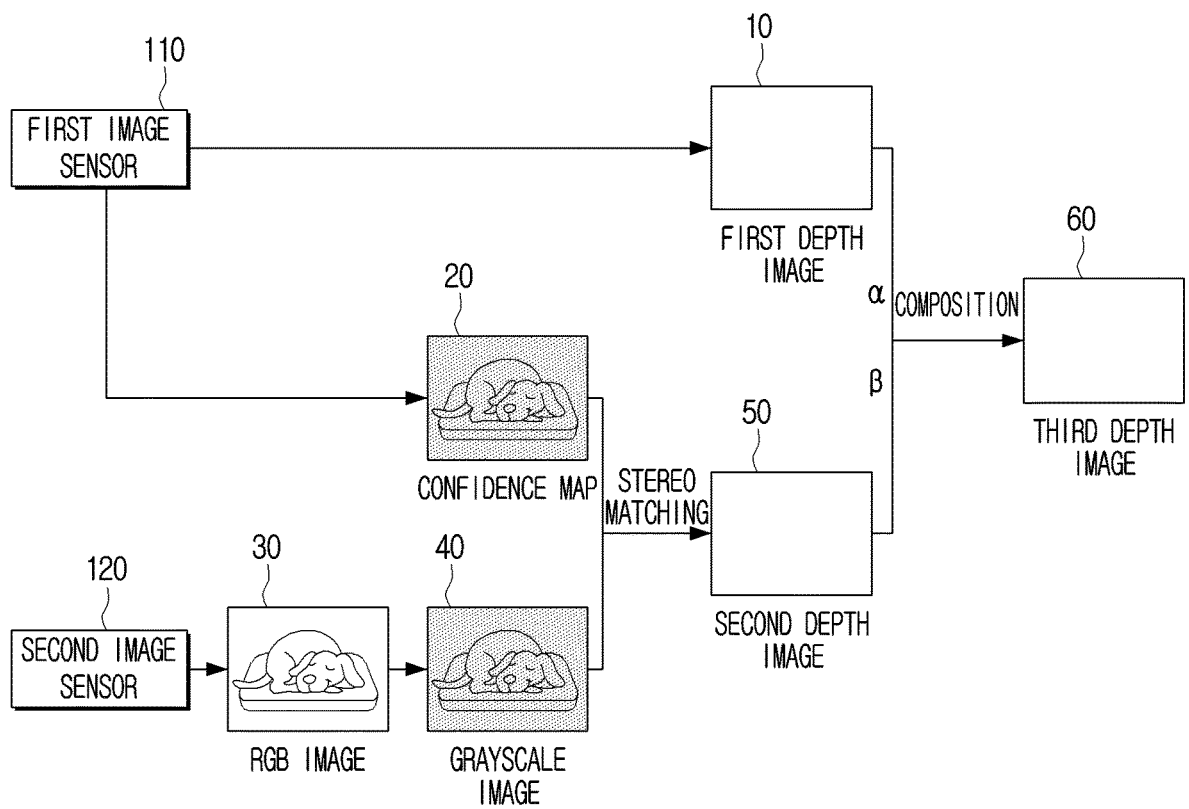
FIG. 1 is a diagram for describing a method of acquiring a depth image according to an example embodiment of the disclosure.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Because the disclosure may be variously modified and have several embodiments, specific embodiments of the disclosure will be illustrated in the drawings and be described in detail in a detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It should be understood that terms "comprise" or "include" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to exemplary embodiments described herein. In addition, in the drawings, portions unrelated to the description will be omitted to obviously describe the disclosure, and similar reference numerals will be used to describe similar portions throughout the specification.

FIG. 1 is a diagram for describing a method of acquiring a depth image according to an example embodiment of the disclosure.

An electronic device 100 may acquire a first depth image 10 by using a first image sensor 110. According to an example embodiment, the electronic device 100 may acquire the first depth image 10 based on a signal output from the first image sensor 110. Here, the first depth image 10 is an image indicating a distance from the electronic device 100 to an object, and a depth value (or distance value) of each pixel of the first depth image may refer to a distance from the electronic device 100 to the object corresponding to each pixel. According to an example embodiment, the depth value may be referred to as a distance value.

The electronic device 100 may acquire a confidence map 20 by using the first image sensor 110. According to an example embodiment, the confidence map 20 may be referred to as a confidence image. Here, the confidence map (or the confidence image) 20 refers to an image representing reliability of depth values for each region of the first depth image 10. In this case, the confidence map 20 may be an infrared (IR) image corresponding to the first depth image 10. However, the disclosure is not limited thereto, and as such, the confidence map 20 may be obtained in a different manner. In addition, the electronic device 100 may determine the reliability of the depth values for each region of the first depth image 10 based on the confidence map 20.

Meanwhile, the electronic device 100 may acquire the confidence map 20 based on a signal output from the first image sensor 110. According to an example embodiment, the first image sensor 110 may include a plurality of sensors that are activated at a particular time. For example, the plurality of sensors may be activated at different times (i.e., at a preset time interval). In this case, the electronic device 100 may acquire a plurality of image data through each of the plurality of sensors. In addition, the electronic device 100 may acquire the confidence map 20 from a plurality of acquired image data. For example, the electronic device 100 may acquire the confidence map 20 through following Equation 1.

$$[Confidence] = abs(I2-I4) - abs(I1-I3) \qquad \text{Equation 1}$$

Here, I1 denotes a first image, I2 denotes a second images, I3 denotes a third image, and I4 denotes a fourth image.

Meanwhile, the first image sensor 110 may be implemented as a time of flight (ToF) sensor or a structured light sensor.

According to an example embodiment, the electronic device 100 may acquire an RGB image 30 using a second image sensor 120. According to an example embodiment, the electronic device 100 may acquire the RGB image based on a signal output from the second image sensor 120. In this case, the RGB image 30 may correspond to the first depth image 10 and the confidence map 20, respectively. For example, the RGB image 30 may be an image for the same timing as the first depth image 10 and the confidence map 20.

The electronic device 100 may acquire the RGB image 30 corresponding to the first depth image 10 and the confidence map 20 by adjusting the activation timing of the first image sensor 110 and the second image sensor 120. In addition, the electronic device 100 may generate a grayscale image 40 based on R, G, and B values of the RGB image 30. Meanwhile, the second image sensor 120 may be implemented as image sensors such as a complementary metal-oxide-semiconductor (CMOS) and a charge-coupled device (CCD).

The electronic device 100 may acquire a second depth image 50 based on the confidence map 20 and the grayscale image 40. In particular, the electronic device 100 may acquire the second depth image 50 by performing stereo matching on the confidence map 20 and the grayscale image 40. Here, the stereo matching refers to a method of calculating a depth value by detecting in which an arbitrary point in one image is located in the other image, and obtaining a shifted amount of the detected result point. The electronic device 100 may identify a corresponding point in the confidence map 20 and the grayscale image 40. In this case, the electronic device 100 may identify a corresponding point by identifying a shape or an outline of the object included in the confidence map 20 and the grayscale image 40. Then, the electronic device 100 may generate the second depth image 50 based on a disparity between the corresponding points identified in each of the confidence map 20 and the grayscale image 40 and a length of a baseline. According to an example embodiment, the length of the baseline may be the distance between the first image sensor 100 and the second image sensor 200. Meanwhile, when the stereo matching may be performed based on the confidence map 20 and the RGB image 30, it may be difficult to find an exact corresponding point due to a difference in pixel values. Accordingly, the electronic device 100 may perform the stereo matching based on the grayscale image 40 instead of the RGB image 30. Accordingly, the electronic device 100 may more accurately identify the corresponding point, and the accuracy of the depth information included in the second depth image 50 may be improved. Meanwhile, the electronic device 100 may perform pre-processing such as correcting a difference in brightness between the confidence map 20 and the grayscale image 40 before performing the stereo matching.

Meanwhile, the ToF sensor has higher angular resolution and distance accuracy than the stereo sensor outside a reference distance, but may have lower angular resolution and distance accuracy than the stereo sensor within the preset distance. Here, angular resolution refers to the ability to distinguish two objects that are separated from each other. According to an example embodiment, the reference distance may be a preset distance or a predetermined disclosure. For instance, the present distance may be a distance within 5 m from the ToF sensor. For example, when an intensity of reflected light is greater than a threshold value, a near-field virtual image may appear on a depth image due to a lens flare or ghost phenomenon. As a result, there is a problem in that the depth image acquired through the ToF sensor includes near-field errors. Accordingly, the electronic device 100 may acquire a third depth image 60 having improved near-field accuracy compared to the first depth image 10 by using the second depth image 50 acquired through the stereo matching.

The electronic device 100 may acquire the third depth image 60 based on the first depth image 10 and the second depth image 50. Specifically, the electronic device 100 may generate the third depth image 60 by combining the first depth image 10 and the second depth image 50. In this case, the electronic device 100 may determine a first composition ratio α of the first depth image 10 and a second composition ratio β of the second depth image 50 based on at least one of the depth value of the first depth image 10 and the pixel value of the confidence map 20. Here, the first composition ratio α and the second composition ratio β may have a value between 0 and 1, and the sum of the first composition ratio α and the second composition ratio β may be 1. For example, when the first composition ratio α is 0.6 (or 60%), the second composition ratio β may be 0.4 (or 40%). Hereinafter, a method of determining the first composition ratio α and the second composition ratio β will be described in more detail.

Figure 2:
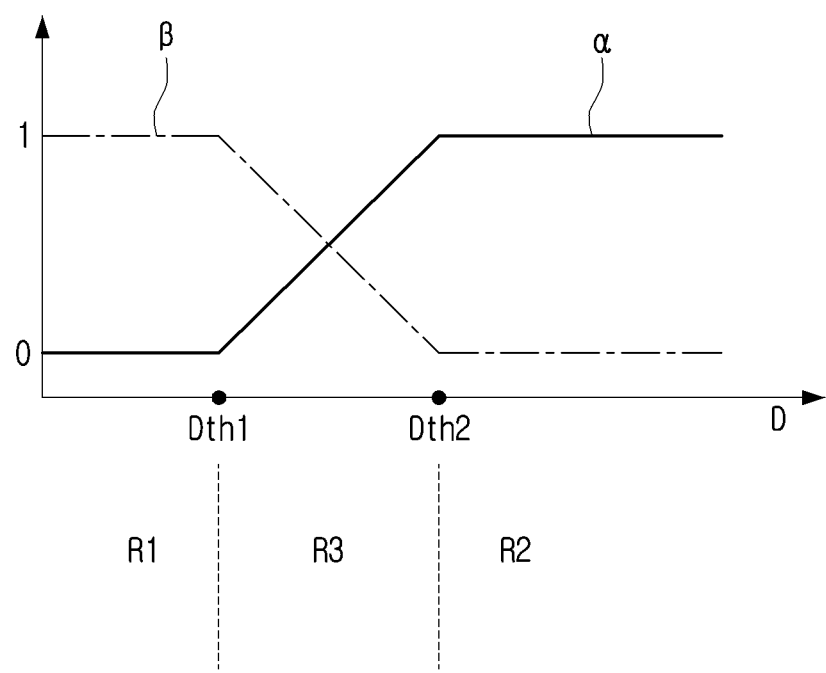
FIG. 2 is a graph illustrating a first composition ratio and a second composition ratio according to a depth value of a first depth image according to an example embodiment of the disclosure.

FIG. 2 is a graph illustrating a first composition ratio and a second composition ratio according to a depth value of a first depth image according to an example embodiment of the disclosure. Referring to FIG. 2, the electronic device 100 may determine the first composition ratio α and the second composition ratio β based on a depth value D of the first depth image 10.

In the electronic device 100, for a first region R1 in which the depth value D is smaller than a first threshold distance Dth1 among the plurality of regions of the first depth image 10, the first composition ratio α may be determined to be 0, and the second composition ratio β may be determined to be 1. According to an example embodiment, the first threshold distance may be a distance of 20 cm. That is, the electronic device 100 may acquire the depth value of the second depth image 50 as the depth value of the third depth image 60 for a region in which the depth value D is smaller than the first threshold distance Dth1 among the plurality of regions. Accordingly, the electronic device 100 may acquire the third depth image 60 with improved near-field accuracy compared to the first depth image 10.

In the electronic device 100, for a second region R2 in which the depth value D is greater than a second threshold distance Dth2 among the plurality of regions of the first depth image 10, the first composition ratio α may be determined to be 1, and the second composition ratio β may be determined to be 0. According to an example embodiment, the first threshold distance may be 3 m. That is, the electronic device 100 may acquire the depth value of the first depth image 50 as the depth value of the third depth image 60 for a region in which the depth value D is greater than the second threshold distance Dth2 among the plurality of regions.

In the electronic device 100, for a third region R3 in which the depth value D is greater than the first threshold distance Dth1 and smaller than the second threshold distance Dth2 among the plurality of regions of the first depth image 10, the first composition ratio α and the second composition ratio β may be determined such that, as the depth value D increases, the first composition ratio α increases and the second composition ratio β decreases. Since the first image sensor 110 has higher far-field angular resolution than the second image sensor 120, as the depth value D increases, the accuracy of the depth value of the third depth image 60 may be improved when the first composition ratio α increases.

Meanwhile, the electronic device 100 may determine the first composition ratio α and the second composition ratio β based on a pixel value P of the confidence map 20.

Figure 3:
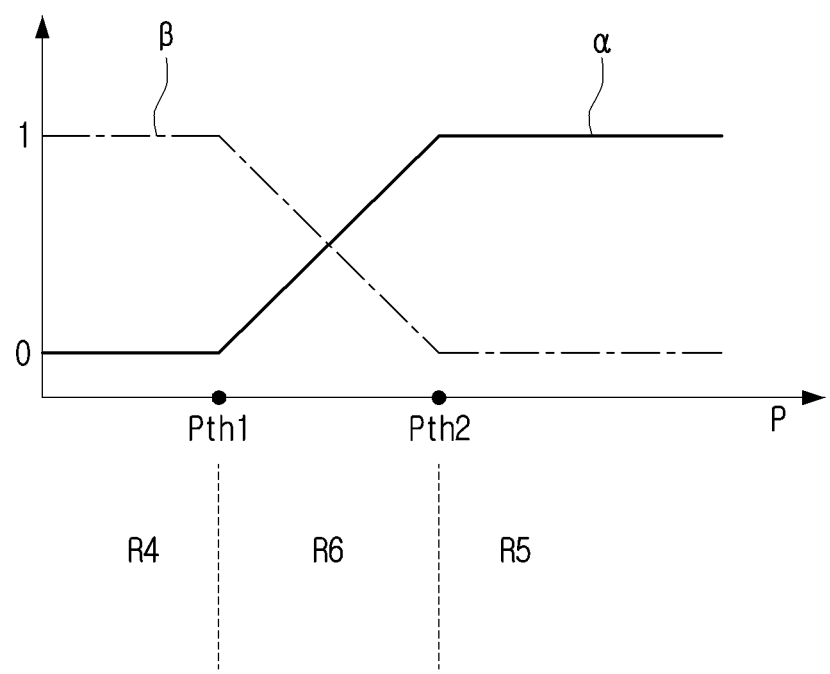
FIG. 3 is a graph illustrating the first composition ratio and the second composition ratio according to a pixel value of a confidence map according to an example embodiment of the disclosure.

FIG. 3 is a graph illustrating the first composition ratio and the second composition ratio according to the pixel value of the confidence map according to an example embodiment of the disclosure.

The electronic device 100 may identify a fourth region R4 in which the pixel value P is smaller than a first threshold value Pth1 among the plurality of regions of the confidence map 20. In addition, when each region of the first depth image 10 and the second depth image 50 corresponding to the fourth region R4 is composed, the electronic device 100 may determine the first composition ratio α as 0 and the second composition ratio β as 1. That is, when it is determined that the reliability of the first depth image 10 is smaller than the first threshold value Pth1, the electronic device 100 may acquire the depth value of the second depth image 50 as the depth value of the third depth image 60. Accordingly, the electronic device 100 may acquire the third depth image 60 with improved distance accuracy compared to the first depth image 10.

The electronic device 100 may identify a fifth region R5 in which the pixel value is greater than a second threshold value Pth2 among the plurality of regions of the confidence map 20. In addition, when each region of the first depth image 10 and the second depth image 50 corresponding to the fifth region R5 is composed, the electronic device 100 may determine the first composition ratio α as 1 and the second composition ratio β as 0. That is, when it is determined that the reliability of the first depth image 10 is smaller than the second threshold value Pth2, the electronic device 100 may acquire the depth value of the first depth image 10 as the depth value of the third depth image 60.

The electronic device 100 may identify a sixth region R6 in which the pixel value P is greater than the first threshold value Pth1 and smaller than the second threshold value Pth2 among the plurality of regions of the confidence map 20. In addition, when each region of the first depth image 10 and the second depth image 50 corresponding to the sixth region R6 is composed, the electronic device 100 may determine the first composition ratio α and the second composition ratio β so that, as the pixel value P increases, the first composition ratio α increases and the second composition ratio β decreases. That is, the electronic device 100 may increase the first composition ratio α as the reliability of the first depth image 10 increases. Accordingly, the accuracy of the depth value of the third depth image 60 may be improved.

Meanwhile, the electronic device 100 may determine the first composition ratio α and the second composition ratio β based on the depth value D of the first depth image 10 and the pixel value P of the confidence map 20. In particular, the electronic device 100 may consider the pixel value P of the confidence map 20 when determining the first composition ratio α and the second composition ratio β for the third region R3. For example, when the pixel value of the confidence map 20 corresponding to the third region R3 is greater than a preset value, the electronic device 100 may determine the first composition ratio α and the second composition ratio β so that the first composition ratio α is greater than the second composition ratio β. On the other hand, when the pixel value of the confidence map 20 corresponding to the third region R3 is smaller than a preset value, the electronic device 100 may determine the first composition ratio α and the second composition ratio β so that the first composition ratio α is smaller than the second composition ratio β. The electronic device 100 may increase the first composition ratio α as the pixel value of the confidence map 20 corresponding to the third region R3 increases. That is, the electronic device 100 may increase the first composition ratio α for the third region R3 as the reliability of the first depth image 10 increases.

The electronic device 100 may acquire the third depth image 60 based on the first composition ratio α and the second composition ratio β thus obtained. The electronic device 100 may acquire the distance information on the object based on the third depth image 60. Alternatively, the electronic device 100 may generate a driving path of the electronic device 100 based on the third depth image 60. Meanwhile, FIGS. 2 and 3 illustrate that the first composition ratio α and the second composition ratio β vary linearly, but this is only an example, and the first composition ratio α and the second composition ratio β may vary non-linearly.

Figure 4:
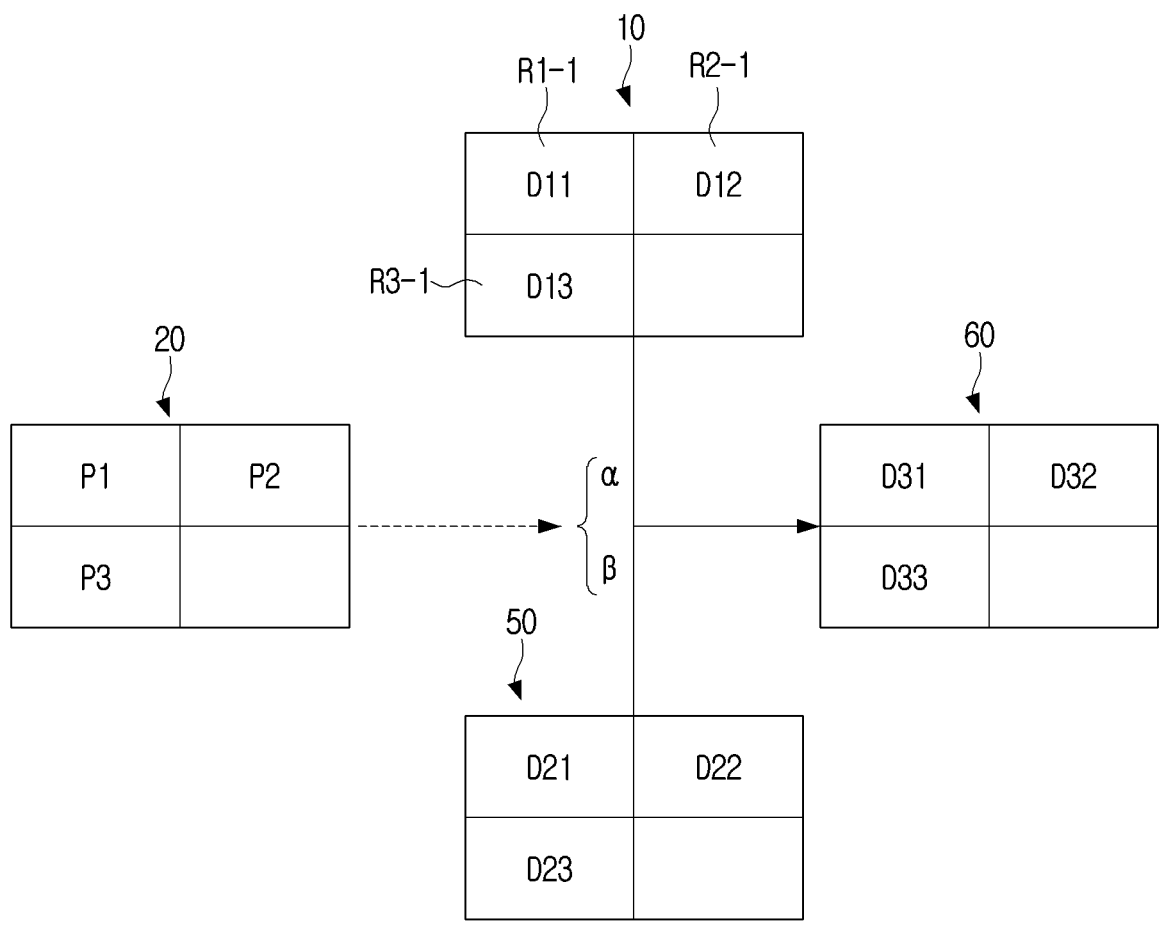
FIG. 4 is a diagram for describing a method of acquiring a third depth image according to an example embodiment of the disclosure.

FIG. 4 is a diagram for describing a method of acquiring a third depth image according to an example embodiment of the disclosure. Referring to FIG. 4, the first depth image 10 may include a 1-1th region R1-1, a 2-1th region R2-1, and a 3-1th region R3-1. The 1-1th region R1-1 may correspond to the first region R1 of FIG. 2, and the 2-1th region R2-1 may correspond to the second region R2 of FIG. 2. That is, a depth value D11 of the 1-1th region R1-1 may be smaller than the first threshold distance Dth1, and a depth value D12 of the 2-1th region R2-1 may be greater than the second threshold distance Dth2. Also, a 3-1th region R3-1 may correspond to the third region R3 of FIG. 2. That is, a depth value D13 of the 3-1th region R3-1 may be greater than the first threshold distance Dth1 and smaller than the second threshold distance Dth2.

When the first depth image 10 and the second depth image 50 are composed for the 1-1th region R1-1, the electronic device 100 may determine the first composition ratio α as 0 and the second composition ratio β as 1. Accordingly, the electronic device 100 may acquire a depth value D21 of the second depth image 50 as a depth value D31 of the third depth image 60.

When the first depth image 10 and the second depth image 50 are composed for the 2-1th region R2-1, the electronic device 100 may determine the first composition ratio α as 1 and the second composition ratio β as 0. Accordingly, the electronic device 100 may acquire the depth value D12 of the first depth image 10 as a depth value D32 of the third depth image 60.

When the first depth image 10 and the second depth image 50 are composed for the 3-1th region R3-1, the electronic device 100 may determine the first composition ratio α and the second composition ratio β based on the confidence map 20. For example, if a depth value P3 of the confidence map 20 is smaller than a preset value, when the first depth image 10 and the second depth image 50 are composed for the 3-1th region R3-1, the electronic device 100 may determine the first composition ratio α and the second composition ratio β so that the first composition ratio α is smaller than the second composition ratio β. As another example, if the depth value P3 of the confidence map 20 is greater than a preset value, when the first depth image 10 and the second depth image 50 are composed for the 3-1th region R3-1, the electronic device 100 may determine the first composition ratio α and the second composition ratio β so that the first composition ratio α is greater than the second composition ratio β. As described above, the electronic device 100 may acquire a depth value D33 of the third depth image 60 by applying the first composition ratio α to the depth value D13 of the first depth image 10, and the second composition ratio β to a depth value D23 of the second depth image 50.

Meanwhile, the electronic device 100 may acquire the third depth image 60 by applying a predetermined composition ratio to the same object included in the first depth image 10 and the second depth image 50.

Figure 5:
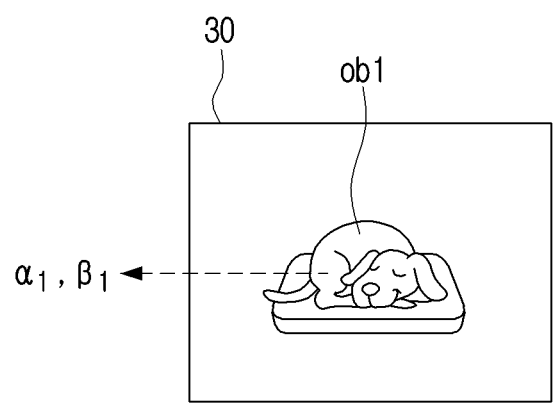
FIG. 5 is a diagram illustrating an RGB image according to an example embodiment of the disclosure.

FIG. 5 is a diagram illustrating an RGB image according to an example embodiment of the disclosure. Referring to FIG. 5, the RGB image 30 may include a first object ob1.

The electronic device 100 may analyze the RGB image 30 to identify the first object ob1. In this case, the electronic device 100 may identify the first object ob1 using an object recognition algorithm. Alternatively, the electronic device 100 may identify the first object ob1 by inputting the RGB image 30 to a neural network model trained to identify an object included in the image.

When the first depth image 10 and the second depth image 50 are composed for the region corresponding to the first object ob1, the electronic device 100 may apply a predetermined composition ratio. For example, the electronic device 100 may apply a 1-1th composition ratio $\alpha_1$ and a 2-1th composition ratio $\beta_1$, which are fixed values, to the region corresponding to the first object ob1. Accordingly, the electronic device 100 may acquire the third depth image 60 in which the distance error for the first object ob1 is improved.

Figure 6:
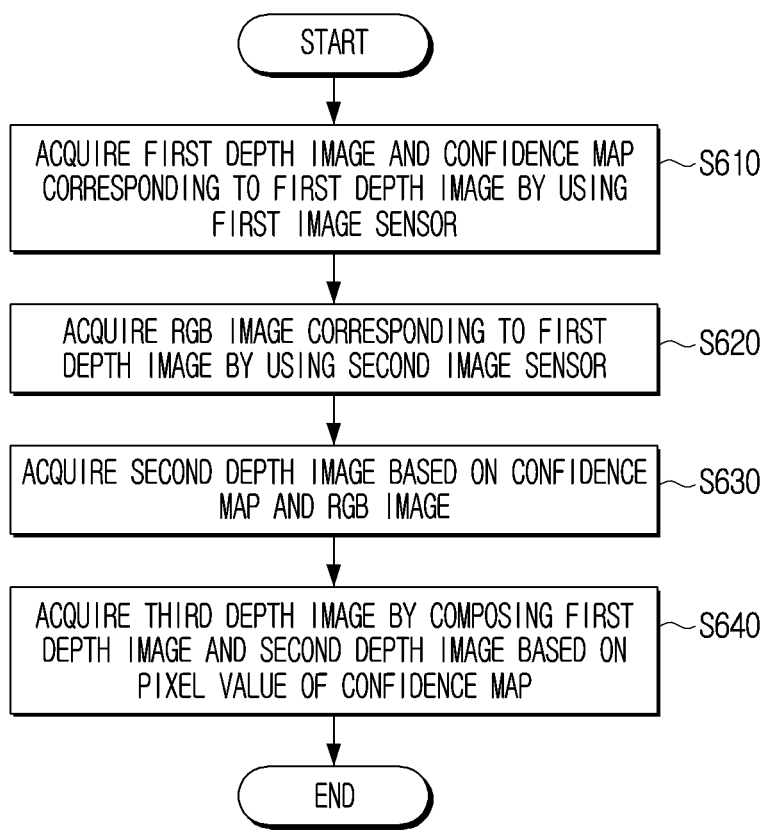
FIG. 6 is a flowchart illustrating a method for controlling an electronic device according to an example embodiment of the disclosure.

FIG. 6 is a flowchart illustrating a method for controlling an electronic device according to an example embodiment of the disclosure.

The electronic device 100 may acquire the first depth image and the confidence map corresponding to the first depth image using the first image sensor (S610), and acquire the RGB image corresponding to the first depth image using the second image sensor (S620). As a detailed description thereof has been described with reference to FIG. 1, a redundant description thereof will be omitted.

The electronic device 100 may acquire the second depth image based on the confidence map and the RGB image (S630). The electronic device 100 may acquire a grayscale image for the RGB image, and acquire the second depth image by performing the stereo matching on the confidence map and the grayscale image. In this case, the electronic device 100 may acquire the second depth image by performing the stereo matching on the confidence map and the grayscale image based on the shape of the object included in the confidence map and the grayscale image.

The electronic device 100 may obtain the third depth image by combining the first depth image and the second depth image based on the pixel value of the confidence map (S640). The electronic device 100 may determine the composition ratio of the first depth image and the second depth image based on the pixel value of the confidence map, and compose the first depth image and the second depth image based on the determined composition ratio to acquire the third depth image. In this case, the electronic device 100 may determine the first composition ratio and the second composition ratio so that the first composition ratio of the first depth image is greater than the second composition ratio of the second depth image for the region in which the pixel value is greater than a preset value among the plurality of regions of the confidence map. The electronic device 100 may determine the first composition ratio and the second composition ratio so that the first composition ratio is smaller than the second composition ratio for the region in which the pixel value is smaller than a preset value among the plurality of regions of the confidence map.

Figure 7:
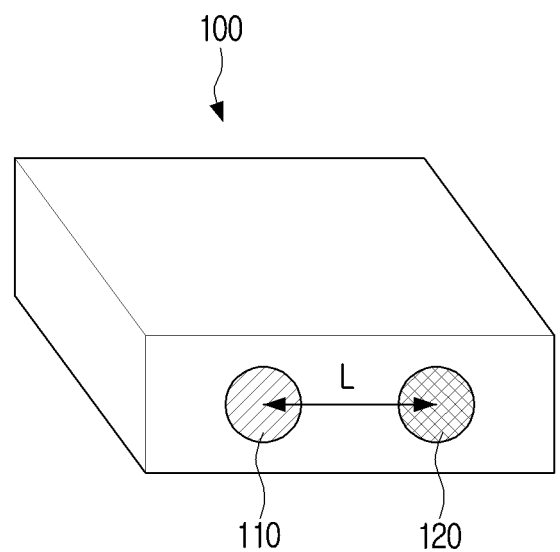
FIG. 7 is a perspective view illustrating an electronic device according to an example embodiment of the disclosure.

FIG. 7 is a perspective view illustrating an electronic device according to an example embodiment of the disclosure.

The electronic device 100 may include the first image sensor 110 and the second image sensor 120. In this case, the distance between the first image sensor 110 and the second image sensor 120 may be defined as a length L of a baseline.

A related art stereo sensor using two cameras has a limitation in that the angular resolution for a long distance is lowered because the length of the baseline is limited. In addition, in order to increase the angular resolution for a long distance, since the length of the baseline needs to increase, there is a problem in that the related art stereo sensor is difficult to miniaturize.

On the other hand, as described above, the electronic device 100 according to the disclosure uses the first image sensor 110 having a higher angular resolution for a long distance compared to the stereo sensor as described above, to acquire the far-field information even if the length L of the baseline does not increase. Accordingly, the electronic device 100 may have a technical effect that it is easier to miniaturize compared to the related art stereo sensor.

Figure 8A:
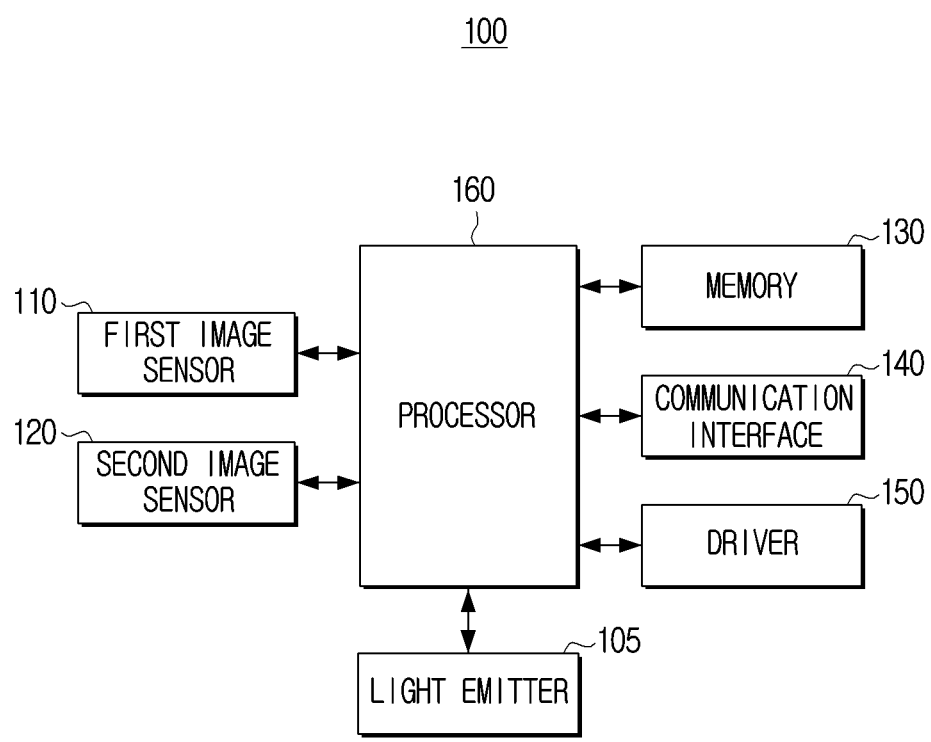
FIG. 8A is a block diagram illustrating a configuration of the electronic device according to the example embodiment of the disclosure.

FIG. 8A is a block diagram illustrating a configuration of the electronic device according to the example embodiment of the disclosure. Referring to FIG. 8A, the electronic device 100 may include a light emitter 105, a first image sensor 110, the second image sensor 120, a memory 130, a communication interface 140, a driver 150, and a processor 160. In particular, the electronic device 100 according to the example embodiment of the disclosure may be implemented as a movable robot.

The light emitter 105 may emit light toward an object. In this case, the light (hereinafter, emitted light) emitted from the light emitter 105 may have a waveform in the form of a sinusoidal wave. However, this is only an example, and the emitted light may have a waveform in the form of a square wave. Also, the light emitter 105 may include various types of laser devices. For example, the light emitter 105 may include a vertical cavity surface emitting laser (VCSEL) or a laser diode (LD). Meanwhile, the light emitter 105 may include a plurality of laser devices. In this case, a plurality of laser devices may be arranged in an array form. Also, the light emitter 105 may emit light of various frequency bands. For example, the light emitter 105 may emit a laser beam having a frequency of 100 MHz.

The first image sensor 110 is configured to acquire the depth image. The first image sensor 110 may acquire reflected light reflected from the object after being emitted from the light emitter 105. The processor 160 may acquire the depth image based on the reflected light acquired by the first image sensor 110. For example, the processor 160 may acquire the depth image based on a difference (i.e., flight time of light) between emission timing of the light emitted from the light emitter 105 and timing at which the image sensor 110 receives the reflected light. Alternatively, the processor 160 may acquire the depth image based on a difference between a phase of the light emitted from the light emitter 105 and a phase of the reflected light acquired by the image sensor 110. Meanwhile, the first image sensor 110 may be implemented as the time of flight (ToF) sensor or the structured light sensor.

The second image sensor 120 is configured to acquire an RGB image. For example, the second image sensor 120 may be implemented as image sensors such as a complementary metal-oxide-semiconductor (CMOS) and a charge-coupled device (CCD).

The memory 130 may store an operating system (OS) for controlling a general operation of components of the electronic device 100 and commands or data related to components of the electronic device 100. To this end, the memory 130 may be implemented as a non-volatile memory (e.g., a hard disk, a solid state drive (SSD), a flash memory), a volatile memory, or the like.

The communication interface 140 includes at least one circuit and may communicate with various types of external devices according to various types of communication methods. The communication interface 140 may include at least one of a Wi-Fi communication module, a cellular communication module, a 3rd generation (3G) mobile communication module, a 4th generation (4G) mobile communication module, a 4th generation Long Term Evolution (LTE) communication module, and a 5th generation (5G) mobile communication module. For example, the electronic device 100 may transmit an image acquired using the second image sensor 120 to a user terminal through the communication interface 140.

The driver 150 is configured to move the electronic device 100. In particular, the driver 150 may include an actuator for driving the electronic device 100. Also, the driver 150 may include an actuator for driving a motion of another physical component (e.g., an arm, etc.) of the electronic device 100. For example, the electronic device 100 may control the driver 150 to move or operate based on the depth information obtained through the first image sensor 110 and the second image sensor 120.

The processor 160 may control the overall operation of the electronic device 100.

Figure 8B:
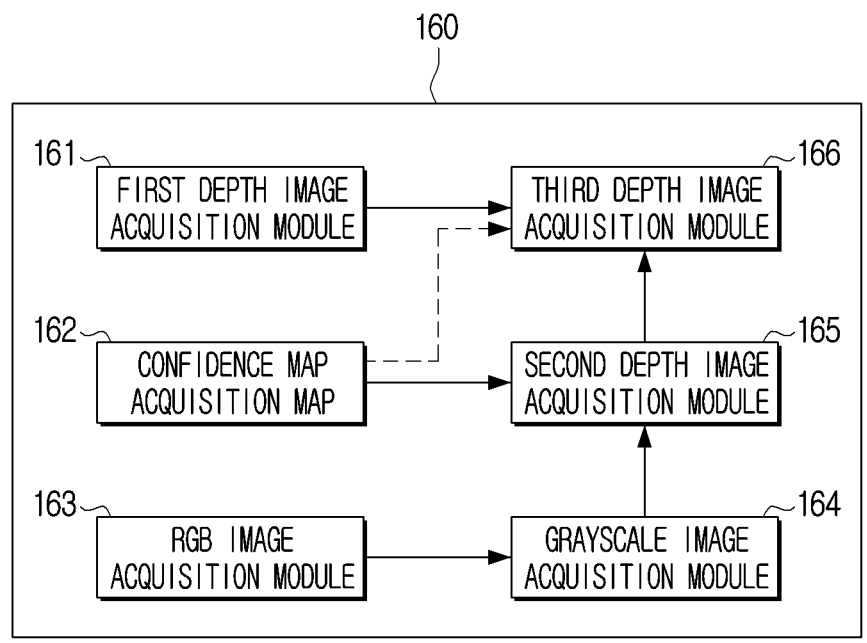
FIG. 8B is a block diagram illustrating a configuration of a processor according to an example embodiment of the disclosure.

Referring to FIG. 8B, the processor 160 may include a first depth image acquisition module 161, a confidence map acquisition module 162, an RGB image acquisition module 163, a grayscale image acquisition module 164, a second depth image acquisition module 165, and a third depth image acquisition module 166. Meanwhile, each module of the processor 160 may be implemented as a software module, but may also be implemented in a form in which software and hardware are combined. According to an example embodiment, the processor 160 may execute one or more instructions stored in the memory to implement the various modules. However, the disclosure is not limited thereto, and as such, the modules may be implemented by hardware components such as circuits. According to an example embodiment, the processor 160 may include one or more processors, which may include a processing unit such as a central processing unit (CPU), a digital signal processor (DSP), a graphics processing unit (GPU), or a machine learning processing unit.

The first depth image acquisition module 161 may acquire the first depth image based on the signal output from the first image sensor 110. Specifically, the first image sensor 110 may include a plurality of sensors that are activated at a preset time difference. In this case, the first depth image acquisition module 161 may calculate a time of flight of light based on a plurality of image data acquired through a plurality of sensors, and acquire the first depth image based on the calculated time of flight of light.

The confidence map acquisition module 162 may acquire the confidence map based on the signal output from the first image sensor 110. Specifically, the first image sensor 110 may include a plurality of sensors that are activated at a preset time difference. In this case, the confidence map acquisition module 162 may acquire a plurality of image data through each of the plurality of sensors. In addition, the confidence map acquisition module 162 may acquire the confidence map 20 using the plurality of acquired image data. For example, the confidence map acquisition module 162 may acquire the confidence map 20 based on Equation 1 described above.

The RGB image acquisition module 163 may acquire the RGB image based on the signal output from the second image sensor 120. In this case, the acquired RGB image may correspond to the first depth image and the confidence map.

The grayscale image acquisition module 164 may acquire the grayscale image based on the RGB image acquired by the RGB image acquisition module 163. Specifically, the grayscale image acquisition module 164 may generate the grayscale image based on the R, G, and B values of the RGB image.

The second depth image acquisition module 165 may acquire the second depth image based on the confidence map acquired by the confidence map acquisition module 162 and the grayscale image acquired by the grayscale image acquisition module 164. Specifically, the second depth image acquisition module 165 may generate the second depth image by performing the stereo matching on the confidence map and the grayscale image. The second depth image acquisition module 165 may identify corresponding points in the confidence map and the grayscale image. In this case, the second depth image acquisition module 165 may identify the corresponding points by identifying the shape or outline of the object included in the confidence map and the grayscale image. In addition, the second depth image acquisition module 165 may generate the second depth image based on the disparity between the corresponding points identified in each of the confidence map and the grayscale image and the length of the baseline.

As such, the second depth image acquisition module 165 may more accurately identify the corresponding points by performing the stereo matching based on the grayscale image instead of the RGB image. Accordingly, it is possible to improve the accuracy of the depth information included in the second depth image. Meanwhile, the second depth image acquisition module 165 may perform preprocessing such as correcting a difference in brightness between the confidence map and the grayscale image before performing the stereo matching.

The third depth image acquisition module 166 may acquire the third depth image based on the first depth image and the second depth image. In detail, the third depth image acquisition module 166 may generate the third depth image by combining the first depth image and the second depth image. In this case, the third depth image acquisition module 166 may determine the first composition ratio for the first depth image and the second composition ratio for the second depth image based on the depth value of the first depth image. For example, the third depth image acquisition module 166 may determine the first composition ratio as 0 and the second composition ratio as 1 for the first region in which the depth value is smaller than the first threshold distance among the plurality of regions of the first depth image. In addition, the third depth image acquisition module 166 may determine the first composition ratio as 1 and the second composition ratio as 0 for the second region in which the depth value is greater than the second threshold distance among the plurality of regions of the first depth image.

Meanwhile, the third depth image acquisition module 166 may determine the composition ratio based on the pixel value of the confidence map for the third region in which the depth value is greater than the first threshold distance and smaller than the second threshold distance among the plurality of regions of the first depth image. For example, when the pixel value of the confidence map corresponding to the third region is smaller than a preset value, the third depth image acquisition module 166 may determine the first composition ratio and the second composition ratio so that the first composition ratio is smaller than the second composition ratio. When the pixel value of the confidence map corresponding to the third region is larger than a reference value, the third depth image acquisition module 166 may determine the first composition ratio and the second composition ratio so that the first composition ratio is greater than the second composition ratio. According to an example embodiment, the reference value is a preset value or predetermined value. That is, the third depth image acquisition module 166 may determine the first composition ratio and the second composition ratio so that the first composition ratio increases and the second composition ratio decreases as the pixel value of the confidence map corresponding to the third region increases.

Meanwhile, the third depth image acquisition module 166 may compose the first depth image and the second depth image with a reference composition ratio for the same object. According to an example embodiment, the reference composition ratio may be a predetermined ration. For example, the third depth image acquisition module 166 may analyze the RGB image to identify the object included in the RGB image. In addition, the third depth image acquisition module 166 may apply a predetermined composition ratio to the first region of the first depth image and the second region of the second depth image corresponding to the identified object to compose the first depth image and the second depth image.

Meanwhile, the processor 160 may perform an adjustment to synchronize the first image sensor 110 and the second image sensor 120. Accordingly, the first depth image, the confidence map, and the second depth image may correspond to each other. That is, the first depth image, the confidence map, and the second depth image may be images for the same timing.

Meanwhile, the diverse example embodiments described above may be implemented in a computer or an apparatus similar to the computer using software, hardware, or a combination of software and hardware. In some cases, example embodiments described in the disclosure may be implemented as a processor itself. According to a software implementation, embodiments such as procedures and functions described in the specification may be implemented as separate software modules. Each of the software modules may perform one or more functions and operations described in the specification.

Meanwhile, computer instructions for performing processing operations according to the diverse example embodiments of the disclosure described above may be stored in a non-transitory computer-readable medium. The computer instructions stored in the non-transitory computer-readable medium may cause a specific device to perform the processing operations according to the diverse embodiments described above when they are executed by a processor.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

Although the example embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device, comprising:
    a first image sensor;
    a second image sensor; and
    a processor configured to:
        obtain a first depth image and a confidence map corresponding to the first depth image based on information received from the first image sensor,
        obtain an RGB image corresponding to the first depth image based on information received from the second image sensor,
        obtain a second depth image based on the confidence map and the RGB image, and
        obtain a third depth image based on a composition of the first depth image and the second depth image determined based on a pixel value of the confidence map,
    wherein the third depth image is obtained by combining the first depth image and the second depth image based on the pixel value of the confidence map.

2. The electronic device as claimed in claim 1, wherein the processor is further configured to obtain a grayscale image from the RGB image, and
    the second depth image is obtained by performing stereo matching on the confidence map and the grayscale image.

3. The electronic device as claimed in claim 2, wherein the processor is further configured to obtain the second depth image by performing stereo matching on the confidence map and the grayscale image based on a shape of an object included in the confidence map and the grayscale image.

4. The electronic device as claimed in claim 1, wherein the processor is further configured to:
    determine a first composition ratio value of the first depth image and a second composition ratio value of the second depth image based on the pixel value of the confidence map, and
    obtain the third depth image by combining the first depth image and the second depth image based on the first composition ratio value and the second composition ratio value.

5. The electronic device as claimed in claim 4, wherein the processor is further configured to:
    determine the first composition ratio value of the first depth image to be greater than the second composition ratio value of the second depth image for a first region in which a pixel value is greater than a reference value among a plurality of regions of the confidence map, and
    determine the first composition ratio value to be smaller than the second composition ratio value for the region in which the pixel value is smaller than the reference value among a plurality of regions of the confidence map.

6. The electronic device as claimed in claim 1, wherein the processor is further configured to:
    obtain a depth value of the second depth image as a depth value of the third depth image for a first region in the third depth image corresponding to a first region among a plurality of regions of the first depth image, in which a depth value of the first depth image is smaller than a first threshold distance, and
    obtain a depth value of the first depth image as a depth value of the third depth image for a second region in the third depth image corresponding to a second region among a plurality of regions of the first depth image in which a depth value of the first depth image is greater than a second threshold distance.

7. The electronic device as claimed in claim 1, wherein the processor is further configured to:
    identify an object included in the RGB image,
    identify each region of the first depth image and the second depth image corresponding to the identified object, and
    obtain the third depth image by combining the first depth image and the second depth image based on a composition ratio for each of the regions.

8. The electronic device as claimed in claim 1, wherein the first image sensor is a time of flight (ToF) sensor, and the second image sensor is an RGB sensor.

9. A method for controlling an electronic device, comprising: obtaining a first depth image and a confidence map corresponding to the first depth image based on information received from a first image sensor; obtaining an RGB image corresponding to the first depth image based on information received from a second image sensor; obtaining a second depth image based on the confidence map and the RGB image; and obtaining a third depth image based on a composition of the first depth image and the second depth image determined based on a pixel value of the confidence map wherein the third depth image is obtained by combining the first depth image and the second depth image based on the pixel value of the confidence map.

10. The method as claimed in claim 9, further comprises:
    obtaining a grayscale image for the RGB image, and
    obtaining the second depth image by stereo matching the confidence map and the grayscale image.

11. The method as claimed in claim 10, further comprises:
    obtaining the second depth image by stereo matching the confidence map and the grayscale image based on a shape of an object included in the confidence map and the grayscale image.

12. The method as claimed in claim 9, further comprises:
    determining a first composition ratio value of the first depth image and a second composition ratio value of the second depth image based on the pixel value of the confidence map, and
    obtaining the third depth image by combining the first depth image and the second depth image based on the first composition ratio value and the second composition ratio value.

13. The method as claimed in claim 12, further comprising:
    determining the first composition ratio value of the first depth image to be greater than the second composition ratio value of the second depth image for a first region in which a pixel value is greater than a reference value among a plurality of regions of the confidence map, and
    determining the first composition ratio value to be smaller than the second composition ratio value for the region in which the pixel value is smaller than the reference value among a plurality of regions of the confidence map.

14. The method as claimed in claim 9, further comprises:
    obtaining a depth value of the second depth image as a depth value of the third depth image for a first region in the third depth image corresponding to a first region among a plurality of regions of the first depth image, in which a depth value of the first depth image is smaller than a first threshold distance, and
    obtaining a depth value of the first depth image as a depth value of the third depth image for a second region in the third depth image corresponding to a second region among a plurality of regions of the first depth image in which a depth value of the first depth image is greater than a second threshold distance.

15. The method as claimed in claim 9, further comprises:
identifying an object included in the RGB image;
identifying each region of the first depth image and the second depth image corresponding to the identified object, and
acquiring the third depth image by combining the first depth image and the second depth image based on a composition ratio for each of the identified regions.

16. The electronic device as claimed in claim 1, wherein the third depth image is obtained based on a first composition ratio of the first depth image and a second composition ratio of the second depth image determined based on the pixel value of the confidence map.

17. The electronic device as claimed in claim 1, wherein a depth value of each pixel of the second depth image is a distance from the electronic device to an object corresponding to the each pixel of the second depth image.

* * * * *